Patented Dec. 23, 1941

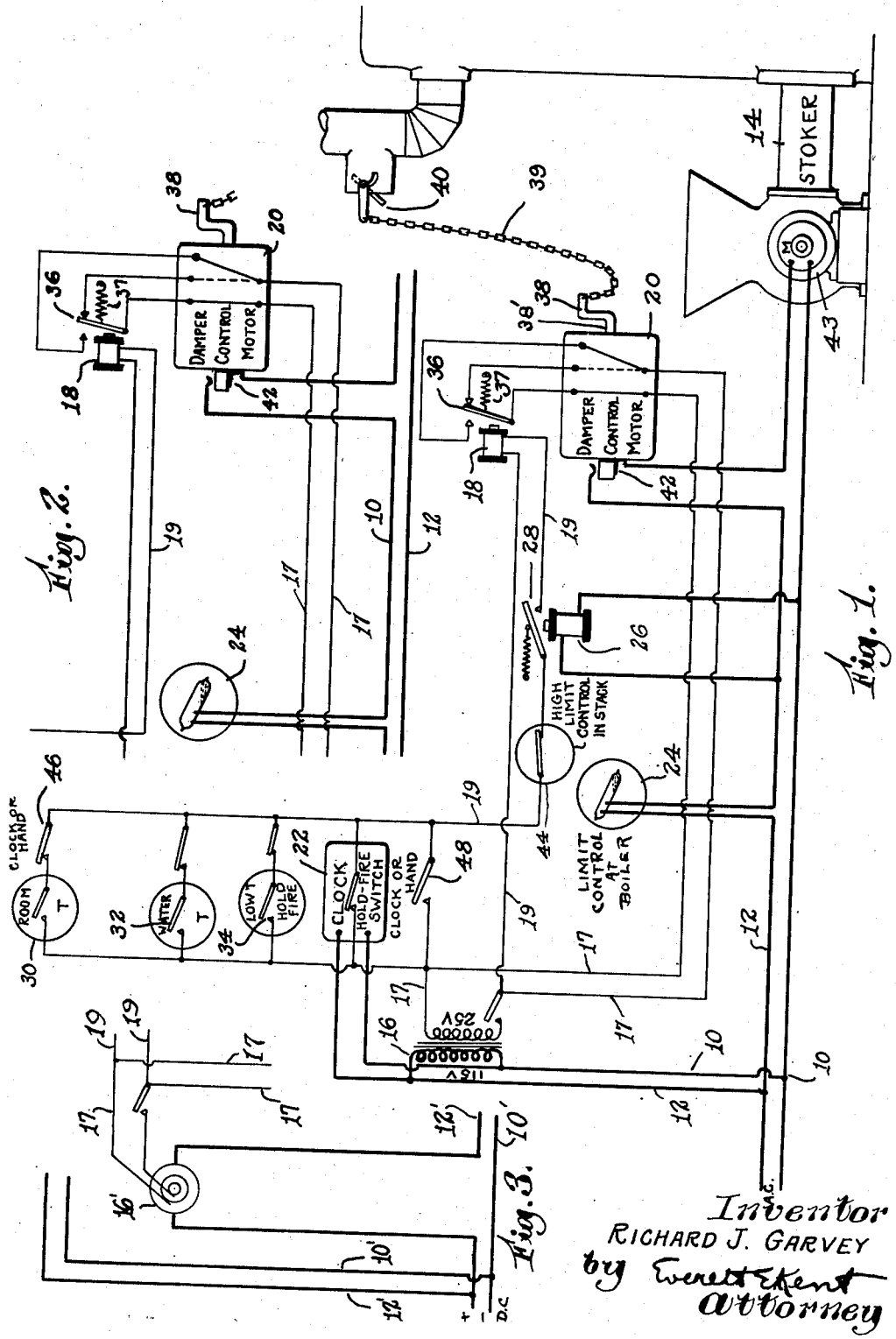

2,267,500

UNITED STATES PATENT OFFICE 2,267,500

AUTOMATIC CONTROL SYSTEM FOR FUEL FEEDERS

Richard J. Garvey, Boston, Mass.

Application October 17, 1938, Serial No. 235,330

7 Claims. (Cl. 236—9)

This invention relates to improvements in automatic control systems for fuel feeders.

More particularly it provides a combination of automatic fuel-feeding controls which is selectively self-inhibitory for economy of fuel.

It is customary to equip a furnace, for heating a building by steam or other system, with auxiliary apparatus for detecting particular conditions, as low temperature, low pressure, or lapse of time, and to provide means for thereupon setting machinery into operation to introduce more fuel to the furnace. Devices which operate successfully for these several purposes are well known, each of them being effective to supply more fuel when any particular control demands more heat; but I have found that conjoint operation of these various devices is wasteful of fuel as compared with a fuel saving ideal which I have conceived possible of attainment. Also I have known the cumulative use of such devices, hitherto, to produce at times an excess of heat, with resulting danger to the building, or to apparatus.

The invention provides, for a coal-stoker or other fuel feeding appliance, an organization of control devices which are combined together so as to act upon each other with the effect that some one or other of them will inhibit the normal effect of some other of them, when the normal effect of action by that other would be an unnecessary instituting, or prolonging, of the introduction of fuel. By self-selective inhibitions, waste of fuel is prevented; economy of consumption is attained; and yet a predetermined sufficiency of combustion and continuance of heat supply is maintained.

Assuming, for illustration, that a coal burning plant of dwelling house type is under consideration, with a mechanical stoker for introducing coal to the furnace, it is already known to have such a stoker be set into operation by a thermostat in the living apartment, whenever the temperature there falls; also to have an aquastat start the stoker for restoring desired temperature of the domestic hot water; also to have a pressurestat start the stoker for maintaining at least a predetermined minimum of pressure in the steam, or an aquastat for maintaining temperature in a hot water radiator system; also, in some cases, an air-stat where the heating medium is hot air. Mechanism for operating drafts and dampers under thermostatic control is also known. Also it is known to have a hold-fire mechanism which will operate the stoker for brief periods at predetermined intervals of time, lest the fire burn itself out during some long period in which none of the other controls has happened to operate to feed fuel.

The present improvement provides so that, if the boiler pressure is at a satisfactory level, the time-control cannot start the stoker to put more coal into the furnace; nor can the living room's thermostat; nor can the aquastat, of either variety; and it provides for this without detracting from the ability of any of these controls to introduce coal if more really is needed, as may be shown, for example, by the occurrence of a thermostatic call for higher temperature at a time when the boiler pressure is too low to furnish what is required. For times when it may be desired to put the thermostat out of ability to control, and yet to maintain boiler pressure, a simple arrangement is provided by which the combination can be shifted and so set that the introduction of fuel can be instituted by low boiler pressure alone.

Also, the combination of the invention may inhibit stoker-action if the gases in the stack are already above a predetermined temperature; or may initiate stoker-action, if those gases are predeterminedly low in temperature; or may permit this latter only if and when a call comes for more temperature in room, or in water, at a time when pressure in the boiler is low. In some cases a control operated by the temperature of flue gases in the stack, for preventing the fire from burning itself out, may, with further economy, be substituted for the corresponding control which is operated by lapse-of-time mechanism.

When the fire is burning normally it is an important element in economy of management that the supplying of air for the combustion is restricted to a predetermined low rate, except that while fuel is being added the draft should be abundant, usually aided by a blower. The invention combines provision for this variation, coacting with the other features. To this end it has a damper motor, which may be of any known or suitable type for providing a reciprocating travel, as by rotating a crank a half turn, or swinging an arm, thereby to pull a barometric damper or check draft of suitable type so as to open the flue for full draft through the fire, or on the next half turn or opposite swing to let the damper move so as partially to close off the combustion draft in the flue, letting the damper adjust itself to whatever setting it finds to be proper for the conditions which prevail from moment to moment. Connected with this crank, or arm, is one pole of the service switch of the stoker, or of the feeding device for whatever other fuel may be employed, as, for feeding oil or gas. In the case of coal fuel the partial closing of the flue, as by the opening of the check draft, restrains the rate of combustion. In the case of oil or gas fuel the opening of the check valve restrains the indraft of cold air through the combustion chamber, and so delays the consequent taking of heat out through the flue. This conserves heat in the body of fire brick around the combustion chamber whence the conserved heat can pass into the steam, water or air heating medium of the building.

Any of the parallel control devices in the secondary circuit, e. g., the room thermostat, can activate the service relay, to feed in fuel, but can do this only if, on the one hand, the boiler pressure is below the predetermined low limit, and if, on the other hand, the fire is not already too hot. If the fire is already very strong a combined call of room and of boiler for heat will not start the fuel feeding motor, even though boiler pressure is below the low limit. Introducing more fuel would unduly waste heat through the stack. Under the circumstances the high-temperature detector in the stack inhibits operation of the fuel-service relay. But when the fire is moderate or low, and the boiler pressure down, a call by any of the parallel control devices in the secondary circuit will operate the service relay to clear the flue, by closing the check draft, and to introduce more fuel, until either the particular call for heat is satisfied; or until the boiler acquires a pressure which in course of time will satisfy that call; or until heat is again being wasted through the stack. So, likewise, the clock hold-fire device, having a normal function to operate the stoker for a limited period, e. g. two minutes, at fixed intervals, e. g. half hourly, will half hourly test the situation by closing its switch, but if the boiler pressure is then satisfactory, or if the fire is very hot as shown by flue gas temperature, it will not initiate a feeding of fuel, for under either of these circumstances an introducing of fuel would be wasteful, and unnecessary since presumably such a fire would hold for another half hour without too great depletion.

For this general purpose, of self-selecting inhibition of unnecessary combustion, the invention provides a wiring system by which the controls may operate upon each other to produce the stated results. One feature is the simplicity of the system and connections between controls. Further features will appear in the more detailed description which follows.

It is intended that the patent shall cover, by suitable expression in the appended claims, whatever features of patentable novelty exist in the invention disclosed.

The accompanying drawing illustrates an embodiment of the invention by diagrams wherein the several pieces of apparatus indicated are each of any suitable design of the respective kind, satisfactory makes of which are already known.

In the drawing:

Figure 1 is a diagram of a combination of automatic devices for controlling the feeding of fuel by a coal stoker operated by an electric system containing the various controls, wherein one automatic device in the high voltage circuit can annul the effect of all of the automatic devices in the low voltage circuit, and, when not thus annulled, those automatic devices in the low voltage circuit can severally control the stoker part of the high voltage circuit;

Figure 2 is a diagram of similar import, differing in that the control of the reduced voltage circuit by the said control device in the high voltage circuit is omitted.

Figure 3 is a diagram of a wiring adaptation of a part of the system of Figure 1 or Figure 2 for direct current supply.

The apparatus represented in Figure 1 of the drawing assumes a conventional source of alternating current, for which 115 volts is indicated, therein called the high voltage, to supply a main circuit 10, 12 for operating the stoker 14, across which is shunted a transformer 16 for providing a secondary circuit of suitable reduced voltage, which may be 25 volts, for operating by circuit 17 or 19 the service relay 18, the damper motor 20, and, if desired, the clock 22 of the time-operated hold-fire device; the incidental wiring of the interior of the building for control of the furnace feeding being thus of low voltage. The boiler limit control switch 24, is preferably on the high tension line. This switch becomes closed by fall of steam boiler pressure, or, in the comparable cases where the heating medium is other than steam it is an aquastat or an air-stat, becoming closed upon fall of temperature of the heating medium to the predetermined limit. In all cases it opens when the pressure, or temperature, has risen to the predetermined upper limit. Devices which will operate thus are known, one such being mercury switches which are tilted and become overbalanced by the change of conditions. In the arrangement shown in Figure 1 this limit control 24 is in series with the stoker in the main circuit; and a relay coil 26 is shunted across the main circuit, between the control switch 24 and a stoker service switch 42 at the damper motor 20. Relay coil 26 operates a switch 28 in the secondary circuit, which switch is in series with the service relay 18 in the secondary circuit. In consequence the service relay 18 cannot operate to start the stoker motor unless the limit control 24 or its equivalent in a water or air system, is closed so as to pass a current through the relay 26. If a high stack-temperature limit control is employed this may preferably be on the low voltage circuit, in series with the service relay 18. The other controls are switches, mutually in parallel, in one of the 25 volt circuits from the transformer 16, but each and all in series with the service relay 18 and with the said switch 28 in the secondary circuit which is closed only when the relay coil 26 is energized, which is when the boiler limit control 24 is in closed condition.

The controls represented in parallel in the secondary circuit illustrate those suitable for a steam heating system for a building and are: a thermostat 30 for living apartment; an aquastat 32 for domestic hot water service supply, or for radiator water for house heating; a hold-fire, being a thermostat 34 closing at low stack temperature for operating the stoker often enough to prevent the fire burning itself out; and a hold-fire 22, being clock-operated at intervals for a similar purpose. Also there is a hand switch 48, which may if preferred be operated by a clock, night and morning, to shunt all of those parallel controls out of action during night hours.

Each of these controls set in parallel is adapted to set the stoker into operation, but each is combined with one or more other devices, set in the same circuit, so that it cannot start the stoker unless those other devices are also in condition both permitting the circuit to be completed, and calling for more heat.

Assuming that there is a moderate fire, whenever an effective combination of controls is set favorably to call for heat, a circuit becomes established through the service relay 18 and this attracts and closes a switch 36 so that a current flows through the damper motor 20, through the circuit indicated by the full lines there, and operates that motor until it has turned the damper-operating crank 38 through 180°. This pulls chain 39 and closes the check draft 40 of a flue, and sets other drafts or dampers (not illustrated) to which it may be connected, and may institute action of a blower for forced draft. Toward the end of its 180° turning this motor closes the service switch 42 of the motor 43 that operates the stoker 14, and then stops, ceasing its turning in a position which leaves the switch 42 closed and the stoker motor running. To this end the service switch 42 of the stoker is represented located on an extension of the crank shaft 38' of the damper motor. When each of the parallel and series controls in the secondary circuit is satisfied by the continued existence or the restoration of the condition which it is guarding, e. g., by a rise of the room thermostat 30 to the temperature which opens its switch, or when there has been a rise of the boiler pressure sufficient to open the limit control switch 28, or if the flow of heat out through the stack becomes excessive so as to open the high temperature stack control switch 44, the said circuit through the service relay 18 becomes broken, and this releases the switch 36 there, which becomes then drawn by a spring 37, so as to make another circuit which goes through the damper motor, indicated by the dotted line there, and sets the damper motor into action to rotate the shaft another half turn. This breaks the circuit through the stoker motor, and then sets the dampers and drafts in position for quiet fire, as by stopping the blower and releasing the check draft; and comes to rest after the half turn, with its full line circuit re-established, in position to be operated again by the service relay 18 whenever the existing conditions shall again be detected as being those predetermined for the feeding of fuel.

A hand operated switch 46, is inserted in the shunt of the room thermostat 30. By opening this hand switch that room thermostat can be put out of control, without interfering with the operation of other parts of the system. Although this switch is, for clearness of showing, represented as being immediately adjacent to the thermostat, the actual location may usually be in the basement at any place convenient to the janitor. Similar attachments can be applied to each of the other parallel controls. Also a hand switch 48 can be set in a shunt parallel to the other controls in the secondary circuit; and by closing this switch all of those parallel devices can be put out of control. In this case the pressure limit control 24, or its equivalent, and the high temperature stack control 44, if present, will be in sole command. By the arrangement thus illustrated, Figure 1, the living room temperature can be let down for the night, or the control by a particular apartment which has a thermostat controlling its heat can be discontinued while that apartment is vacant, while still maintaining control of the furnace and fuel feed by thermostats in other apartments, and governing the rate of combustion, by the other devices, including the barometric damper.

All of these various hand switches may be located in some basement place which is easy of access to the janitor or responsible operating person; and preferably they are there assembled together, on and in a box containing the connecting wires and their various terminal binding posts (not illustrated).

It will be understood that the various controls operated by pressure or temperature may be of any suitable type; but for those which operate automatically tilting switches are at present preferred, such as those of mercury type, especially where it is desired that a fuel feeding, after being once started, shall continue to a stage of pressure or temperature higher than that at which it was instituted.

The various parallel controls in the secondary circuit are independent of each other; any of them may at choice be omitted; or others may be added in similar combination.

The invention can be applied for feeding fuels other than coal, by making obvious substitutions of suitable apparatus.

In some instances, where the premises do not require so elaborate and comprehensive an automatic service, the simpler arrangement illustrated in Figure 2 may be used, for the portion of the installation there shown, wherein the relay 26, 28, is omitted. In Figure 2 the pressure limit control switch 24 is in the main circuit in series with the stoker motor, as in Figure 1, but it has no connection with or effect upon the secondary circuit. The latter contains such of the parallel controls as may be desired, any of which therefore can operate the stoker motor, through the service relay as in Figure 1, provided the boiler limit control 24 permits, and provided the high temperature stack control also permits, if that be present.

The damper motor, driving the half-turn-and-stop shaft, controls the stoker in both arrangements illustrated, Figures 1 and 2. Likewise, in both, the stoker cannot start unless the boiler pressure is down, at 24, and there is in addition a call from some one of the parallel controls. Such a call turns the damper motor, but when the parallel controls are all cut out by a closing of the hand switch 48 the stoker switch 42 at the damper motor remains closed, with dampers always in condition for the fullness of draft which is desired at times when fuel is being introduced; and the stoker circuit is completed for introduction of fuel whenever boiler pressure goes down so as to close the limit switch 24. In both cases a sufficient rise of boiler pressure will stop the stoker.

The damper motor is apparatus of well known type in which a motor is connected through reduction gear so as to turn a shaft or move an arm to a position to pull or to release a chain controlling the closing or releasing of a check draft or other damper.

There is ordinarily a blower in connection with a stoker or an oil burner, but if not, or if the invention be installed for a hand-fired furnace, it is well known that the damper chain may have a branch (not illustrated) connected to pull open a draft for intake of air below the grate, and to release the same for gravity to close this intake, whenever the controls would, in the instance here illustrated, start or stop the stoker.

The combining of the stoker switch with the damper shaft, for operation by the controls described, is a feature of particular merit and utility. This dispenses with the providing of special mechanism, of the half turn and stop variety, for operating a stoker switch. The stoker switch is illustrated diagrammatically as a fixed brush for touching a contact point fixed on the shaft, at one of its stop positions; but in practice it may be of any suitable variety, a tilting mercury switch, being preferred, and such can be operated by a mere protuberance mounted on either end of the damper operating half-turn-shaft, sufficient to tilt the switch. Or there may be a protuberance on the shaft for closing together two contact points set adjacent to the shaft.

The simplicity of the wiring by which the invention may be operated is another feature of merit both by itself and because of the facility which it offers for the connecting of various controls, independent of each other but each having ability to coact with the boiler pressure limit control, or other limit of heat control, to institute and to arrest action of the stoker. But it is another feature that no one of these can keep the stoker in operation after the boiler pressure, or the stack temperature in case a pyrostat is in the system, is up to the predetermined limit. A sufficient rise of boiler pressure breaks the secondary circuit through the service relay 18 and also, at the damper motor and at the limit control 24, breaks the main circuit through the stoker motor, in the case of Figure 1; or breaks only the main circuit through the stoker motor, at 24, in the case of Figure 2; and each is done even though the room thermostat is not yet satisfied. This makes a great saving, for there is often considerable lag in getting a cold room warm, even after radiators are as hot as they normally should be. Also it is a safeguard against a continued improper demand by a room thermostat, as when an open window is keeping the room cool.

If direct current is supplied the transformer may be a rotary converter, delivering its output at a reduced voltage of either alternating or direct current, according to the type selected.

Figure 3 shows adaptation for electrical supply by direct current. Considerable expense may be saved by connecting a small rotary converter, say of about one-fiftieth of one horsepower, in series with a relay coil 26 in shunt in the main circuit, this being also in series with the branch of the circuit which goes through the boiler limit control switch. Whenever the latter is closed the direct current passes through it, and the converter will then produce a current in the secondary circuits. The secondary circuits will all be dead except when the boiler limit control switch is closed. The converted current therein, when flowing, may be either direct or alternating according to the choice of type of rotary converter, and will be at whatever low voltage the converter produces. In Figure 3, 10' and 12' indicate the main circuit of the incoming direct current; 16' is a rotary converter, from which issue the secondary circuits 17, 19, as in Figures 1 and 2. The rotary converter 16' will then rotate only when the current is flowing through the branch which leads in Figure 1 through the boiler limit control switch 24, and the relay coil 26, if present, or through the stoker motor, thus making the duty imposed on the rotary converter be very light. If the rotary converter or other transformer is connected across the two mains 10, 12 of this Figure 1, the limit control switch, operated by boiler pressure or other conditions at the furnace, can be located directly in the secondary circuit which controls the damper shaft.

I claim as my invention:

1. Mechanism for controlling furnace combustion in a system having a furnace with fuel feeding means, flue, damper, damper setter, and control devices therefor, including a main electrical circuit operating the fuel feed and containing a service switch therefor; and a transformer having a secondary electrical circuit arranged to control the damper setter and having divers devices with switches to make this circuit, each of which said divers devices has its switch connected in parallel with each other of them and is in series with the control device for the damper setter; there being means, thus controlled, for operating said damper setter; and said damper setter being of the type which operates the damper to either fully open or fully closed position, with connection by which the said service switch of the main circuit becomes set simultaneously with the setting of the damper; the said mechanism being a combination, for controlling a system such as the foregoing, in which a simultaneity of the energizing of said main and secondary circuits is requisite for the operating of the fuel-feeding mechanism; said combination including in one of those circuits a switch in series in the control circuit of the fuel feeding means; there being a means for moving this switch which means is exposed to and operated by conditions produced by the furnace, and is adapted to actuate the switch on the occurring of predetermined conditions; said combination including, among the said parallel devices which are in series with the control device of the damper setter, a room thermostat controlled switch, and a periodic switch with time mechanism closing it for brief periods at regular intervals of time, thereby periodically tending to complete the secondary circuit, for the establishing of the said simultaneity.

2. A combination as in claim 1 in which one of said switches is a limit control switch in series with the fuel feeding motor, and, between this switch and this motor, a shunt stands across the main circuit, containing a relay coil; and another limit control switch, actuated by that relay coil, is located in the said secondary circuit which controls the starting of the damper motor, being in series with the said devices which are in parallel therein.

3. Mechanism as in claim 1, in which there is for controlling the said circuit for operating the damper setter, a control switch comprising a spring and a relay for overpowering the spring, this relay being in the said circuit containing the said divers devices; each of these said devices being of a character tending to make and to break the circuit through the relay.

4. In a combustion controlling system, having a furnace and flue with damper, and having means for feeding fuel to the furnace, the combination therewith of a main electrical circuit having an electric motor for actuating the fuel feeding means; a second electrical circuit having damper actuating means; and a third electrical circuit having in parallel a plurality of automatic control devices, and having, in series with those control devices, a limit switch and a device controlling the operation of said damper actuating means in said second circuit responsive to the coincident closing of said series switch and one of said parallel automatic switch control devices in the third circuit; there being a switch in said main circuit, in series with the fuel feeding motor, actuated by said damper actuating means in the second circuit; and a limit control device located in the main circuit, comprising a switch additional to said switch therein, but also controlling actuation of fuel feeding, and being itself responsive to predetermined conditions at the furnace.

5. Mechanism as in claim 1, in which the said means for operating the damper setter is a secondary circuit separate from that circuit which contains the said divers devices for controlling the damper-setter.

6. Mechanism for controlling furnace combustion in a system having a furnace with fuel feeding means, flue, damper, damper setter, and control devices therefor, including a main electrical circuit operating the fuel feeder and containing a service switch therefor; and a transformer having a secondary electrical circuit arranged to control the damper setter and having divers devices with switches to make this circuit, each of which said divers devices has its switch connected in parallel with each other of them and is in series with the control device for the damper setter; there being means, thus controlled, for operating said damper setter; and said damper setter being of the type which operates the damper to either fully open or fully closed position, with connection by which the said service switch of the main circuit becomes set simultaneously with the setting of the damper; the said mechanism being a combination, for controlling a system such as the foregoing, in which a simultaneity of the energizing of said main and secondary circuits is requisite for the operating of the fuel-feeding mechanism; said combination including a switch in the secondary circuit, in series with all of said divers devices; a relay in the main circuit, operating this switch; and a switch in the main circuit, controlling this relay and having operating means which is exposed to conditions produced by the furnace, and is actuated thereby at predetermined values thereof; the said combination including, among the said parallel devices in the secondary circuit, a room thermostat controlled switch tending to complete the secondary circuit when the room temperature is below a predetermined minimum, for the establishing of the said simultaneity.

7. Mechanism for controlling furnace combustion in a system having a furnace with fuel feeding means, flue, damper, damper setter, and control devices therefor, including a main electrical circuit operating the fuel feeder and containing a service switch therefor; and a transformer having a secondary electrical circuit arranged to control the damper setter and having divers devices with switches to make this circuit, each of which said divers devices has its switch connected in parallel with each other of them and is in series with the control device for the damper setter; there being means, thus controlled, for operating said damper setter; and said damper setter being of the type which operates the damper to either fully open or fully closed position, with connection by which the said service switch of the main circuit becomes set simultaneously with the setting of the damper; the said mechanism being a combination, for controlling a system such as the foregoing, in which a simultaneity of the energizing of said main and secondary circuits is requisite for the operating of the fuel-feeding mechanism; said combination including a switch in the main circuit, there being means, exposed to conditions produced by the furnace and actuated thereby, to operate this switch when certain predetermined conditions are so produced; and said combination including, among the said parallel devices in the secondary circuit, a room thermostat controlled switch, and a periodic switch with time mechanism closing it for brief periods at regular intervals of time, thereby periodically tending to complete the secondary circuit, for the establishing of the said simultaneity.

RICHARD J. GARVEY.